United States Patent
Yokota et al.

(10) Patent No.: US 9,325,871 B2
(45) Date of Patent: Apr. 26, 2016

(54) IMAGE FORMING APPARATUS

(71) Applicant: FUJI XEROX CO., LTD., Minato-ku, Tokyo (JP)

(72) Inventors: Shusaku Yokota, Kanagawa (JP); Yoji Nishida, Kanagawa (JP); Tomoaki Kitamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/589,552

(22) Filed: Jan. 5, 2015

(65) Prior Publication Data

US 2015/0281486 A1    Oct. 1, 2015

(30) Foreign Application Priority Data

Mar. 25, 2014    (JP) .................................. 2014-062460

(51) Int. Cl.
*H04N 1/04* (2006.01)
*H04N 1/00* (2006.01)

(52) U.S. Cl.
CPC .................................. *H04N 1/00562* (2013.01)

(58) Field of Classification Search
CPC .................................................. H04N 1/00562

USPC ................................... 358/474, 498, 497, 461
See application file for complete search history.

(56) References Cited

U.S. PATENT DOCUMENTS

| 8,711,406 B2* | 4/2014 | Ito ........................... G03G 15/60 |
| | | 358/1.15 |
| 2012/0057209 A1* | 3/2012 | Nakamura ............. H04N 1/401 |
| | | 358/461 |

FOREIGN PATENT DOCUMENTS

JP    2005-260665 A    9/2005

* cited by examiner

*Primary Examiner* — Houshang Safaipour
(74) *Attorney, Agent, or Firm* — Sughrue Mion, PLLC (57) ABSTRACT

An image forming apparatus includes an image forming apparatus body including an image forming section that forms an image, an image reading device disposed on an upper side of the image forming apparatus body to read an image, a first wall provided in the image forming apparatus body, a second wall provided in the image reading device to overlap with the first wall in an up-down direction, and at least one support member provided in the image forming apparatus body or the image reading device to overlap with the first wall and the second wall in the up-down direction, the at least one support member supporting the image reading device relative to the image forming apparatus body.

17 Claims, 5 Drawing Sheets

IMAGE FORMING APPARATUS

CROSS-REFERENCE TO RELATED APPLICATIONS

This application is based on and claims priority under 35 USC 119 from Japanese Patent Application No. 2014-062460 filed Mar. 25, 2014.

BACKGROUND

1. Technical Field

The present invention relates to an image forming apparatus.

2. Summary

According to an aspect of the invention, there is provided an image forming apparatus including an image forming apparatus body including an image forming section that forms an image, an image reading device disposed on an upper side of the image forming apparatus body to read an image, a first wall provided in the image forming apparatus body, a second wall provided in the image reading device to overlap with the first wall in an up-down direction, and at least one support member provided in the image forming apparatus body or the image reading device to overlap with the first wall and the second wall in the up-down direction, the at least one support member supporting the image reading device relative to the image forming apparatus body.

BRIEF DESCRIPTION OF THE DRAWINGS

An exemplary embodiment of the present invention will be described in detail based on the following figures, wherein.

DETAILED DESCRIPTION

Figure 1:
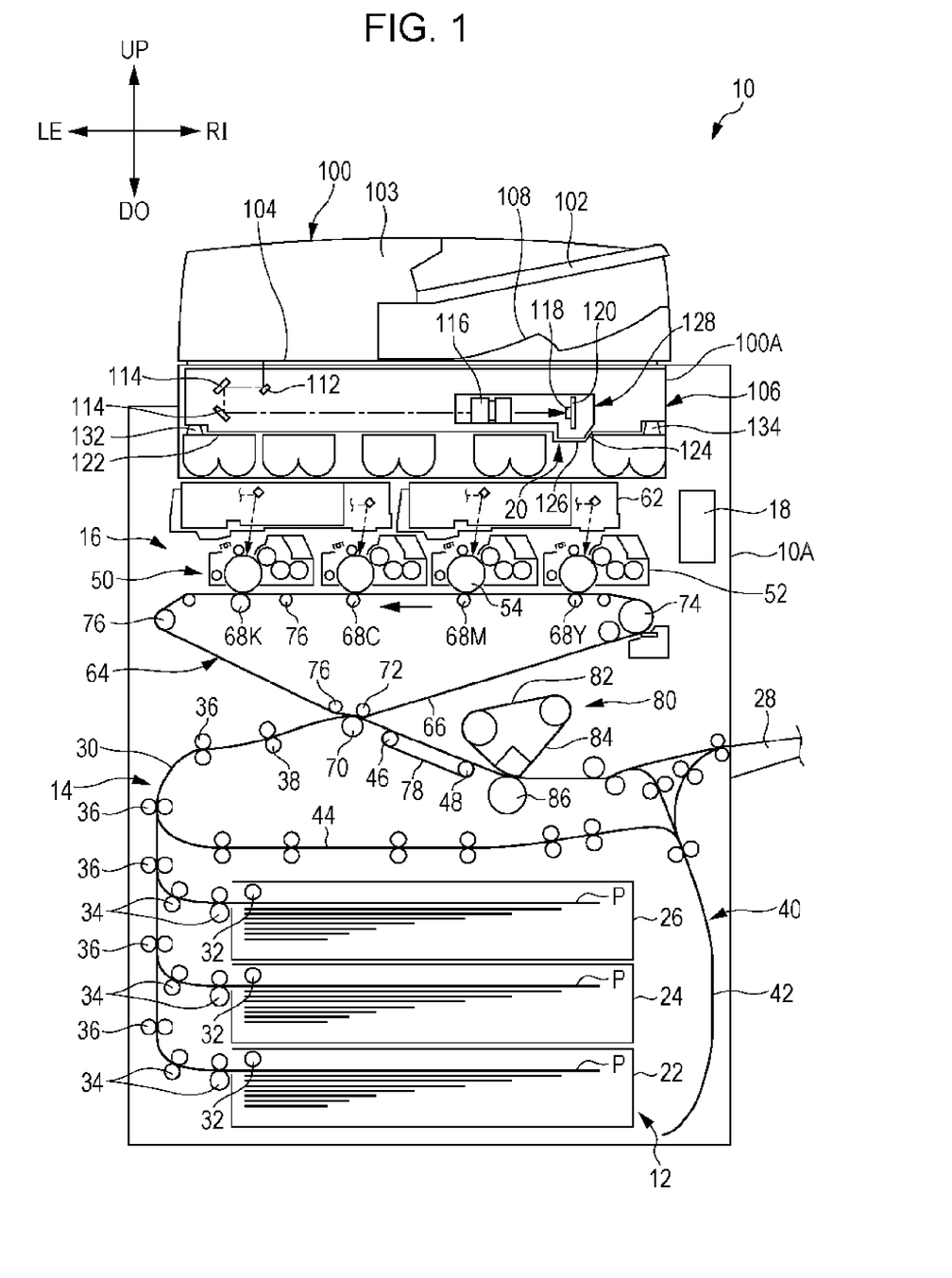
FIG. 1 is a front view illustrating the overall configuration of an image forming apparatus including an image reading device.
Figure 4:
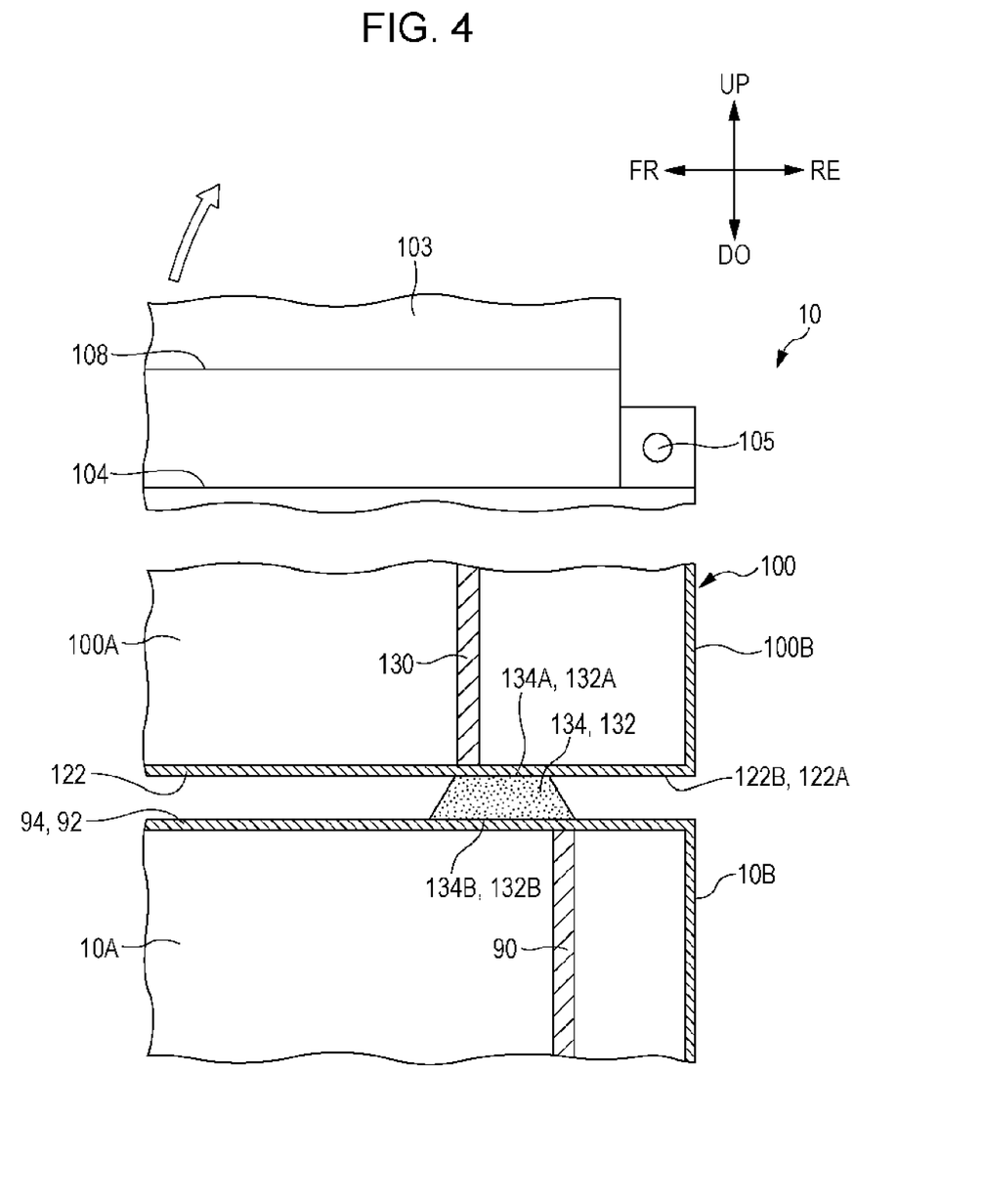
FIG. 4 is an enlarged sectional side view of a part of the image forming apparatus including the image reading device.
Figure 5:
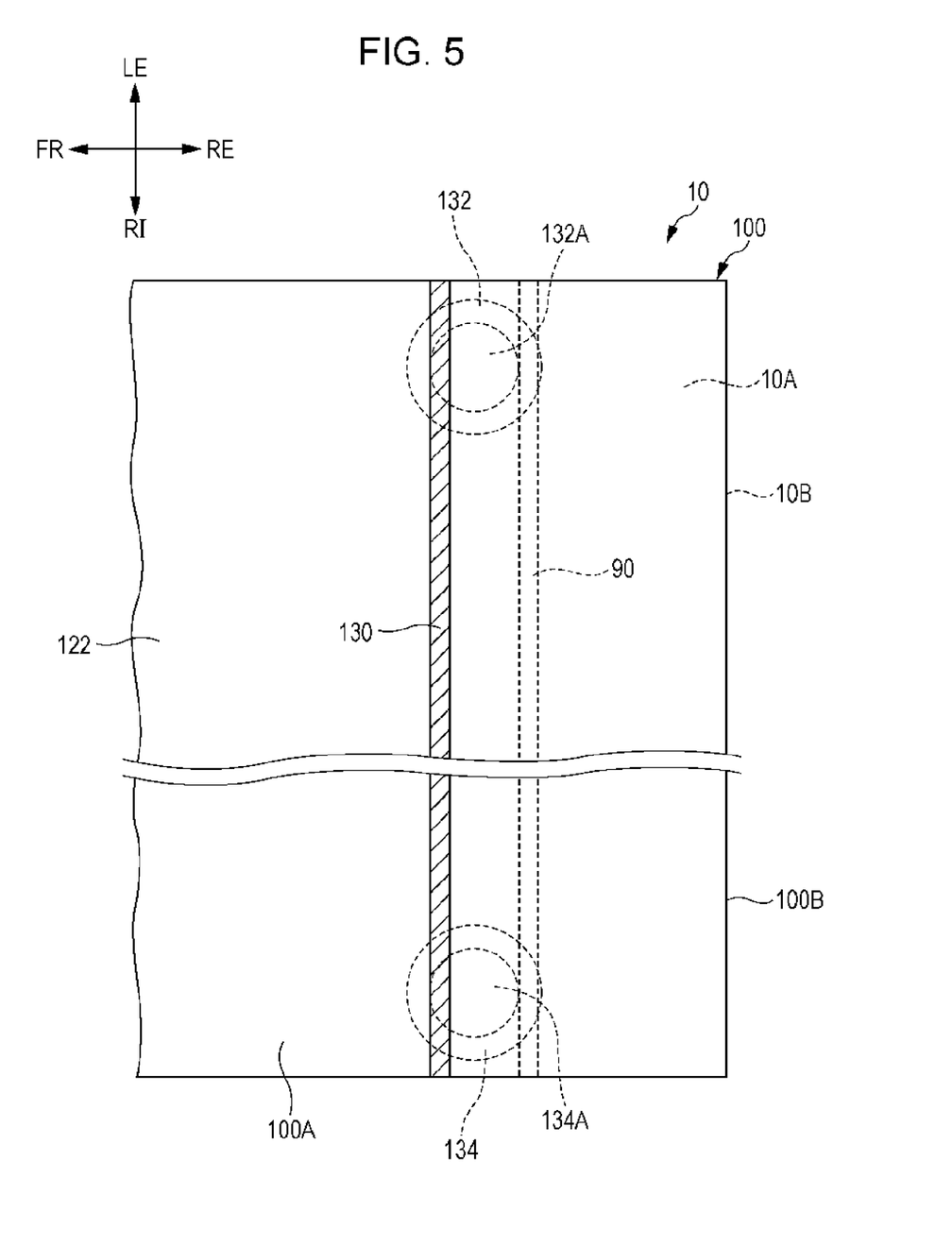
FIG. 5 is an enlarged sectional plan view of a part of the image forming apparatus including the image reading device.

An exemplary embodiment of the present invention will be described in detail below with reference to the drawings. As illustrated in FIG. 1, arrow RI represents the right direction, arrow LE represents the left direction, arrow UP represents the upward direction, and arrow DO represents the downward direction, when an image forming apparatus 10 is viewed from the front side. As illustrated in FIGS. 4 and 5, arrow FR represents the frontward direction and arrow RE represents the rearward direction when an image reading device 100 is viewed in side view and plan view. Further, in the following, an upstream side in the transport direction of a recording medium (recording paper P) is sometimes simply referred to as "upstream side", and a downstream side in the transport direction of the recording medium (recording paper P) is sometimes simply referred to as "downstream side."

As illustrated in FIG. 1, the image forming apparatus 10 includes an image forming apparatus body 10A serving as a housing formed by plural frame members and panel members. In a lower part of the image forming apparatus body 10A, a paper storage section 12 is disposed to store sheets of recording paper P serving as an example of a recording medium. Above the paper storage section 12, a transport section 14 is disposed to transport recording paper P to a principal operating section 16 (to be described later).

Above the transport section 14, a principal operating section 16 is disposed to form an image on recording paper P supplied from the paper storage section 12. Above the principal operating section 16, an image reading device 100 is disposed to read a document (not illustrated). Within the principal operating section 16, a controller 18 is provided to control the operations of the sections of the image forming apparatus 10 and the image reading device 100.

The paper storage section 12 includes a first storage unit 22, a second storage unit 24, and a third storage unit 26 that stores sheets of recording paper P having different sizes. The transport section 14 includes, for example, feed rollers 32, transport rollers 34 and 36, and registration rollers 38 that transport the sheets of recording paper P of different sizes stored in the first storage unit 22, the second storage unit 24, and the third storage unit 26.

More specifically, a feed roller 32 for feeding out stored sheets of recording paper P one by one is disposed in an upper left end portion of each of the first storage unit 22, the second storage unit 24, and the third storage unit 26. On the downstream side of the feed roller 32, transport rollers 34 are disposed to transport fed recording paper P to a transport path 30 in the transport section 14.

In the transport path 30 downstream of the transport rollers 34, transport rollers 36 are disposed to transport sheets of recording paper P one by one. On the downstream side of the transport rollers 36, registration rollers 38 are disposed to determine an image transfer position by temporarily stopping recording paper P and then feeding the recording paper P to a second transfer position (to be described later) at a predetermined time.

On the downstream side of a fixing device 80 (to be described later) and on the upstream side of a paper output portion 28 in the transport path 30, a duplex transport path 40 is connected such that recording paper P is transported and inverted therein when forming an image on a back surface of the recording paper P. Between the transport path 30 and the duplex transport path 40, an introduction member (not illustrated) is provided to introduce the recording paper P from the transport path 30 into the duplex transport path 40.

The duplex transport path 40 includes an inverting unit 42 linearly extending downward to temporarily retain recording paper P having a front surface on which an image has been formed, when the image forming apparatus 10 is viewed from the front side. The duplex transport path 40 further includes a supply path 44 substantially linearly extending from the right to the left to supply the recording paper P retained in the inverting unit 42 to the transport rollers 36 again. After the recording paper P is supplied to the transport rollers 36 again through the supply path 44, an image is transferred onto a back surface of the recording paper P at a second transfer position (to be described later).

Figure 2:
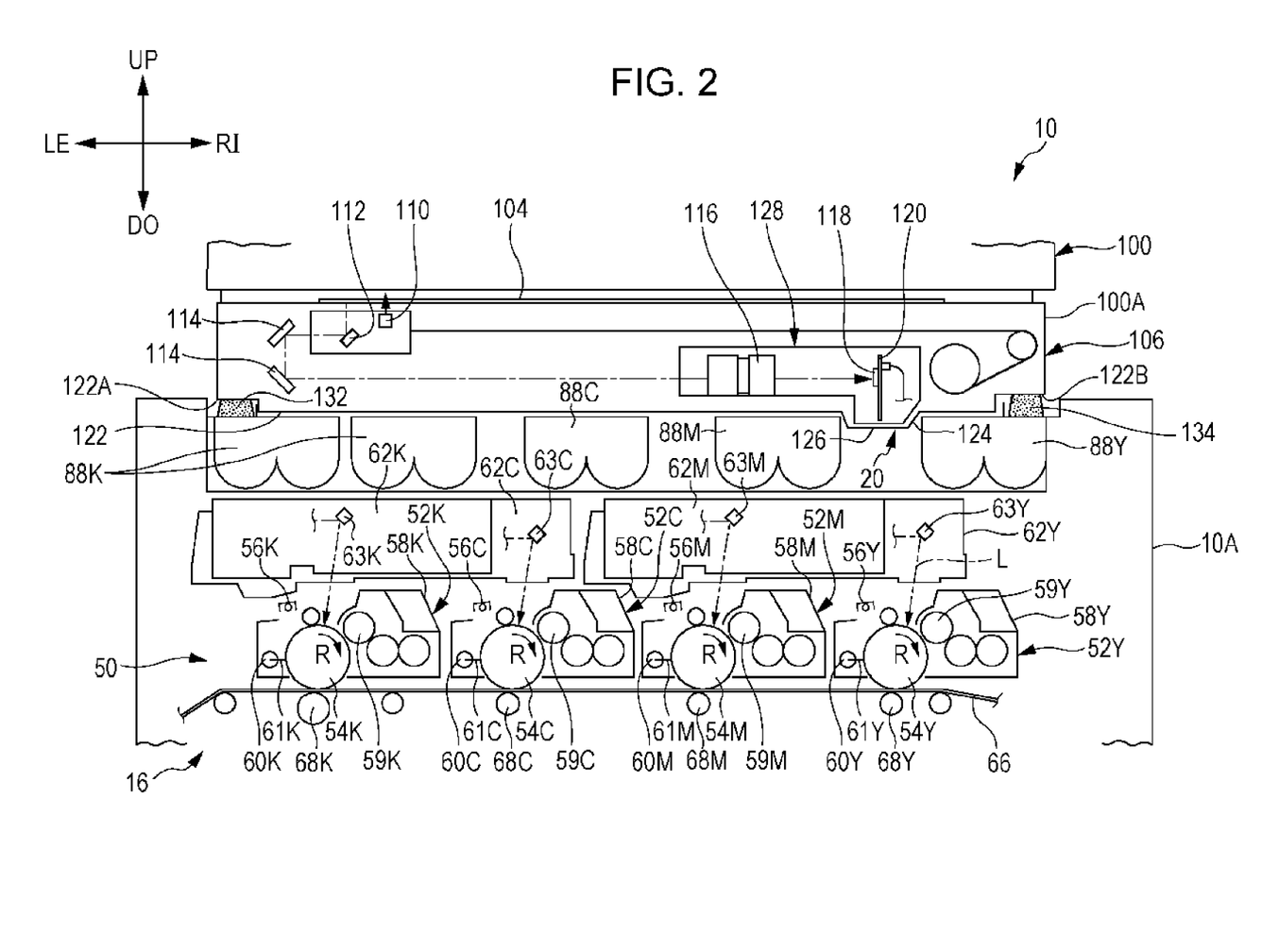
FIG. 2 is an enlarged front view of a part of the image forming apparatus including the image reading device.

As illustrated in FIGS. 1 and 2, the principal operating section 16 includes an image forming section 50 that forms a toner image on recording paper P, and a fixing device 80 that fixes the toner image formed on the recording paper P by the image forming section 50 with heat and pressure.

The image forming section 50 includes image forming units 52Y, 52M, 52C, and 52K respectively having image carriers 54Y, 54M, 54C, and 54K corresponding to toner colors of yellow (Y), magenta (M), cyan (C), and black (K), exposure units 62Y, 62M, 62C, and 62K that radiate light beams L to outer peripheral surfaces of the image carriers 54Y, 54M, 54C, and 54K to expose the outer peripheral surfaces, and a transfer unit 64 that transfers toner images formed on the outer peripheral surfaces of the image carriers 54Y, 54M, 54C, and 54K onto recording paper P.

In the following, when the colors of yellow (Y), magenta (M), cyan (C), and black (K) have to be distinguished from one another, a component is denoted with any of the letters Y, M, C, and K following a reference numeral. When Y, M, C, and K do not have to be distinguished from one another in a similar configuration, the reference numeral is not followed by any of the letters Y, M, C, and K.

Each image forming unit 52 includes a columnar image carrier 54 whose axial direction coincides with the front-rear direction and which may be rotated in a direction of arrow R (clockwise direction in FIG. 2) by driving of a motor (not illustrated), and a charger 56, a developing unit 58, and a cleaning device 60 that are provided opposed to an outer peripheral surface of the image carrier 54 and are arranged in order from the upstream side to the downstream side in the rotating direction of the image carrier 54.

Each exposure unit 62 scans a light beam L emitted from a light source (not illustrated) with a rotatable polygon mirror (not illustrated). The light beam L is reflected by plural optical components including a reflecting mirror 63, and is radiated onto the outer peripheral surface of the image carrier 54. The image carrier 54 is provided below the exposure unit 62.

The light beam L emitted from the exposure unit 62 is radiated onto a portion of the outer peripheral surface of the image carrier 54 between the charger 56 and the developing unit 58. Further, an intermediate transfer belt 66 (to be described later) is in contact with a portion of the outer peripheral surface of the image carrier 54 between the developing unit 58 and the cleaning device 60.

As an example, the charger 56 is configured by a corotron charger that charges the outer peripheral surface of the image carrier 54 with the same polarity as toner polarity by applying voltage to a wire to cause corona discharging. The light beam L is radiated onto the charged outer peripheral surface of the image carrier 54 according to image data, so that an electrostatic latent image is formed on the outer peripheral surface.

For example, the developing unit 58 stores developer in which carrier particles made of a magnetic material and negatively charged toner are mixed, and includes a cylindrical developing sleeve 59 in which a magnet roller (not illustrated) having plural magnetic poles in the circumferential direction is provided. The developing unit 58 forms a magnetic brush in a portion opposed to the image carrier 54 while rotating the developing sleeve 59.

Further, the developing unit 58 forms a visible toner image (developer image) by developing the electrostatic latent image on the outer peripheral surface of the image carrier 54 with the toner by applying developing bias from a voltage application unit (not illustrated) to the developing sleeve 59. To the developing unit 58 for each color, toner is supplied from a toner cartridge 88 for the color provided above the image forming section 50.

The cleaning device 60 includes a cleaning blade 61 in contact with the outer peripheral surface of the image carrier 54, and scrapes off and recovers toner remaining on the outer peripheral surface of the image carrier 54 with the cleaning blade 61. On the downstream side of the developing unit 58 in the rotating direction of the image carrier 54, an intermediate transfer belt 66 on which a toner image developed by the developing unit 58 is to be first-transferred is provided.

As illustrated in FIG. 1, the transfer unit 64 includes an endless intermediate transfer belt 66, first transfer rollers 68 (68Y, 68M, 68C, and 68K) that first-transfer toner images from the corresponding image carriers 54 onto the intermediate transfer belt 66, a second transfer roller 70 that second-transfers the toner images superposed in order on the intermediate transfer belt 66 onto recording paper P, and an auxiliary roller 72.

On an inner side of the intermediate transfer belt 66, a driving roller 74 to be rotated, and plural rotatable driven rollers 76 are disposed. The intermediate transfer belt 66 is wound around the first transfer rollers 68Y, 68M, 68C, and 68K, the driving roller 74, the driven rollers 76, and the auxiliary roller 72. The intermediate transfer belt 66 is circularly moved in the counterclockwise direction in FIG. 1 by rotation of the driving roller 74.

For example, each first transfer roller 68 is configured such that an elastic layer (not illustrated) is provided around a columnar shaft made of metal such as stainless steel. Both end portions of the shaft are supported by bearings to allow rotation of the first transfer roller 68. Further, voltage (positive voltage) with a polarity opposite from the toner polarity is applied from a power supply (not illustrated) to the shaft of the first transfer roller 68.

For example, the second transfer roller 70 has a structure similar to that of the first transfer roller 68, and is rotatably disposed on the downstream side of the registration rollers 38 in the transport path 30. The second transfer roller 70 is in contact with a surface (outer surface) of the intermediate transfer belt 66 at a second transfer position such that the intermediate transfer belt 66 is provided between the second transfer roller 70 and the auxiliary roller 72. The second transfer roller 70 is grounded.

The auxiliary roller 72 forms a counter electrode to the second transfer roller 70. Second transfer voltage (negative voltage) is applied to the auxiliary roller 72 via a metal power feed roller (not illustrated) disposed in contact with an outer peripheral surface of the auxiliary roller 72. When the second transfer voltage is applied to the auxiliary roller 72, a potential difference is formed between the auxiliary roller 72 and the second transfer roller 70, and the toner images on the intermediate transfer belt 66 are thereby second-transferred onto recording paper P transported to a contact portion between the second transfer roller 70 and the intermediate transfer belt 66.

On the downstream side of the second transfer roller 70, a transport belt 78 is provided to transport the recording paper P to the fixing device 80 after second transfer of the toner image is finished. The transport belt 78 is wound around a support roller 46 and a driving roller 48, and circularly moves to transport the recording paper P to the fixing device 80.

The fixing device 80 includes a heating belt mechanism 82 having a fixing belt 84 for heating and fixing a toner image transferred on recording paper P, and a pressure roller 86 for pressing the recording paper P against the fixing belt 84. Therefore, the toner image transferred on the recording paper P is fixed on the recording paper P that is transported while being heated and pressed by the fixing belt 84 and the pressure roller 86.

Next, the image reading device 100 will be described. As illustrated in FIG. 1, the image reading device 100 includes a document table 102 on which plural documents (not illustrated) may be placed, a document transport unit 103 that transports the documents placed on the document table 102 to a document output unit 108 (to be described later), a platen glass 104 on which one document is to be placed, a document reading unit 106 that reads the document placed on the platen glass 104 (transported by the document transport unit 103), and a document output unit 108 to which the read document is to be output.

The document table 102, the document transport unit 103, and the document output unit 108 serve as an example of an opening and closing unit in the image reading device 100. As illustrated in FIG. 4, the document table 102, the document transport unit 103, and the document output unit 108 use a hinge portion 105 provided on a side of a rear wall 10B of the image forming apparatus body 10A and a rear wall 100B of an image reading device body 100A to open and close the platen glass 104.

As illustrated in FIG. 2, the document reading unit 106 includes an image reading device body 100A serving as a housing formed by plural frame members and panel members. Within the image reading device body 100A, there are provided a light irradiating unit 110 that radiates light onto a document placed on the platen glass 104 while moving in the right-left direction of FIG. 2, and one full-rate mirror 112 and two half-rate mirrors 114 that reflect and return the light radiated by the light irradiating unit 110 and reflected by the document in a direction parallel to the platen glass 104.

The light irradiating unit 110 radiates light all over a so-called main scanning direction perpendicular to the moving direction in plan view. To radiate light onto a document transported by the document transport unit 103, the light irradiating unit 110 does not move, but is fixed.

The document reading unit 106 further includes an imaging lens 116 on which reflected light returned by the full-rate mirror 112 and the half-rate mirrors 114 is to be incident, and a photoelectric conversion element 118 that converts the reflected light imaged by the imaging lens 116 into electric signals. The photoelectric conversion element 118 is disposed opposed to the imaging lens 116, and is provided on a base plate 120. An imaging system 128 is configured to include at least the imaging lens 116 and the photoelectric conversion element 118 (base plate 120). The imaging system 128 is fixed.

As illustrated in FIG. 2, the image reading device 100 is provided on an upper side of the toner cartridges 88. That is, for example, a panel member (not illustrated) for covering the top of the image forming apparatus body 10A is not provided between the toner cartridges 88 and the image reading device 100, but the image reading device 100 is directly disposed on the upper side of the toner cartridges 88.

More specifically, a bottom wall of the image reading device body 100A just below a portion where the base plate 120 is disposed serves as a projecting bottom wall 126 projecting downward from a bottom wall 122 just below the other portions. The bottom wall 122 and the projecting bottom wall 126 are integrally connected by a connecting wall 124.

The image reading device body 100A is directly disposed on the upper side of the toner cartridges 88Y, 88M, 88C, and 88K such that the projecting bottom wall 126 is disposed between the toner cartridge 88Y and the toner cartridge 88M (such that the connecting wall 124 overlaps with the toner cartridges 88 in the up-down direction). Therefore, a space between the toner cartridge 88Y and the toner cartridge 88M serves as a receiving portion 20 provided in the image forming apparatus body 10A to receive the projecting bottom wall 126.

Figure 3:
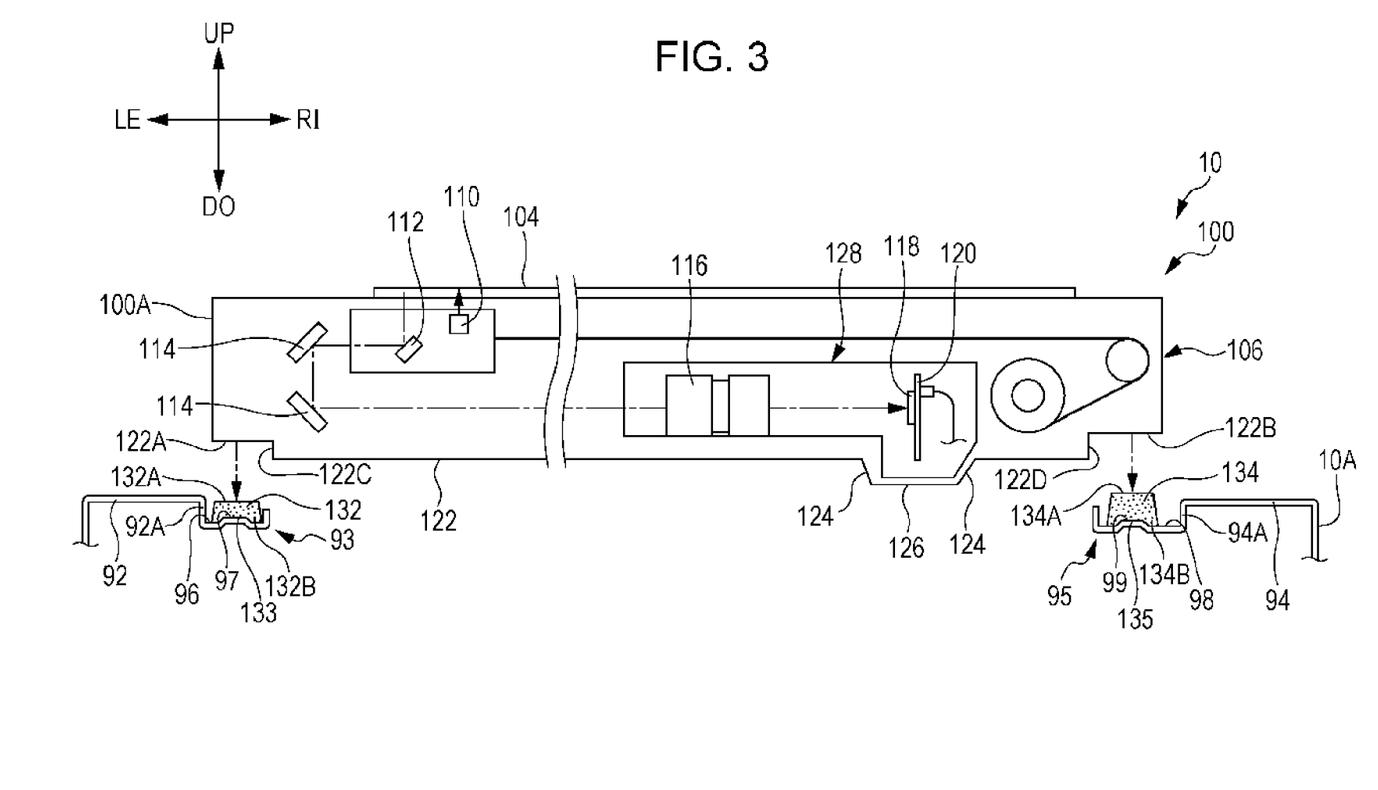
FIG. 3 is a front view illustrating a state in which the image reading device is located apart upward from an image forming apparatus body.

As illustrated in FIG. 3, support frames 92 and 94 extending inward in the right-left direction are provided at right and left end portions (right and left sides) of the upper part of the image forming apparatus body 10A, respectively. The support frames 92 and 94 of the image forming apparatus body 10A overlap with stepped portions 122A and 122B (to be described later), which configurate the bottom wall 122 of the image reading device 100, respectively, in the up-down direction.

More specifically, vertical walls 92A and 94A serving as an example of a first wall to form parts of the support frames 92 and 94 overlap with vertical walls 122C and 122D serving as an example of a second wall to form parts of the stepped portions 122A and 122B, respectively, in the up-down direction with support members 132 and 134 (to be described later) being disposed therebetween. The vertical walls 92A and 94A and the vertical walls 122C and 122D are each formed by perpendicularly bending sheet metal in the downward or upward direction.

Further, reinforcing portions 93 and 95 serving as an example of a bent structure portion are provided in end portions of the support frames 92 and 94 on inner sides of the vertical walls 92A and 94A in the right-left direction, respectively. When viewed from the front side, the reinforcing portions 93 and 95 include the vertical walls 92A and 94A and are bent to have a U-shaped or substantially U-shaped cross section opening upward. The reinforcing portions 93 and 95 extend in the front-rear direction.

The reinforcing portions 93 and 95 including the vertical walls 92A and 94A define groove portions 96 and 98 extending in the front-rear direction, respectively, and reinforce the inner end portions of the support frames 92 and 94 in the right-left direction. That is, the reinforcing portions 93 and 95 (groove portions 96 and 98) ensure rigidity (increase strength) of the support frames 92 and 94 that support support members 132 and 134 (to be described later).

As illustrated in FIGS. 3 to 5, plural pairs of right and left support members 132 and 134 are disposed in the groove portions 96 and 98 of the image forming apparatus body 10A, respectively, to support the image reading device 100 relative to the image forming apparatus body 10A. That is, plural support members 132 and 134 having the same thickness are arranged at predetermined intervals in the front-left direction (not illustrated). Thus, the heights of the supporting surface and the supported surface are fixed in the front-rear direction (main scanning direction).

The support members 132 and 134 are disposed with the light irradiating unit 110 and the imaging system 128 being disposed therebetween. Further, the support members 132 and 134 are shaped like a truncated cone (column), and are formed of an elastic material (for example, a rubber material). The right (one side in the right-left direction) support members 134 close to the imaging system 128 are thicker (taller) than the left (the other side in the right-left direction) support members 132.

The heights of inner upper faces of the right and left groove portions 96 and 98 are equal, and the support members 132 and 134 are attached by being joined to the inner upper faces of the groove portions 96 and 98, respectively, with a joining member such as adhesive tape. In opposite end portions of the bottom wall 122 of the image reading device body 100A in the right-left direction, stepped portions 122A and 122B are provided to be supported by the support members 132 and 134, respectively.

The stepped portions 122A and 122B are recessed upward. Front sides and rear sides of the stepped portions 122A and 122B are supported by a pair of right and left support members 132 and 134 provided on the front side of the image forming apparatus body 10A and a pair of right and left support members 132 and 134 provided on the rear side of the image forming apparatus body 10A, respectively.

Therefore, the stepped portion 122B supported by the support members 134 is recessed upward deeper than the stepped portion 122A supported by the support members 132. Thus, the image reading device 100 is horizontally disposed on the upper side of the image forming apparatus body 10A (on the upper side of the toner cartridges 88).

Boss portions 97 and 99 raised upward in a truncated conical shape are provided integrally at predetermined positions on the inner upper faces of the groove portions 96 and 98, respectively. At the bottoms of the support members 132 and 134, truncated conical recesses 133 and 135, in which the boss portions 97 and 99 are to be fitted, are provided respectively.

Therefore, the support members 132 and 134 are positioned by fitting the recesses 133 and 135 on the boss portions 97 and 99, and are joined to the inner upper faces of the groove portions 96 and 98. The shapes of the boss portions 97 and 99 and the recesses 133 and 135 are not limited to the illustrated truncated conical shape.

The image reading device 100 is configured such that lower faces of the stepped portions 122A and 122B provided in the bottom wall 122 of the image reading device body 100A are merely placed on upper faces 132A and 134A of the support members 132 and 134, but are not joined to the upper faces 132A and 134A of the support members 132 and 134. For this reason, the support members 132 and 134 are shaped like a truncated cone, and the area of the upper faces 132A and 134A is smaller than the area of lower faces 132B and 134B.

That is, the contact areas of the upper faces 132A and 134A of the support members 132 and 134 with the bottom wall 122 (stepped portions 122A and 122B) of the image reading device body 100A is reduced to restrict or prevent the image reading device body 100A from adhering to the upper faces 132A and 134A of the support members 132 and 134 over time.

As illustrated in FIGS. 4 and 5, a first standing wall 90 shaped like a flat plate facing in the front-rear direction (extending in the rotation shaft direction of the hinge portion 105) is disposed on a side of the image forming apparatus body 10A near the rear wall 10B. Also, a second standing wall 130 shaped like a flat plate facing in the front-rear direction (extending in the rotation shaft direction of the hinge portion 105) is disposed on a side of the image reading device body 100A near the rear wall 100B and closer to the front side than the first standing wall 90.

An upper end portion of the first standing wall 90 is joined to the support frames 92 and 94 of the image forming apparatus body 10A, and a lower end portion of the second standing wall 130 is joined to the bottom wall 122 (stepped portions 122A and 122B) of the image reading device body 100A. The support members 132 and 134 near the rear walls 10B and 100B are provided to overlap with the first standing wall 90 and the second standing wall 130 in the front-rear direction in side view and plan view.

More specifically, front end portions of the upper faces 132A and 134A of the support members 132 and 134 near the rear walls 10B and 100B are disposed just below the second standing wall 130, and rear end portions of the lower faces 132B and 134B of the support members 132 and 134 near the rear walls 10B and 100B are disposed just above the first standing wall 90.

Thus, even when the front sides of the document table 102, the document transport unit 103, and the document output unit 108 are turned up on the hinge portion 105 (even when the platen glass 104 is opened), support rigidity (strength) is ensured on the upper side of the image forming apparatus body 10A for supporting the document table 102, the document transport unit 103, and the document output unit 108 and on the side of the rear wall 10B.

Next, a description will be given of the operation of the image forming apparatus 10 including the support members 132 and 134 having the above-described structure (in particular, operation of the support members 132 and 134).

To copy (or scan) a document, the document is placed on the document table 102 of the image reading device 100 or placed on the platen glass 104, and copying (or scanning) is started by operating an unillustrated control panel. That is, the document is read by the document reading unit 106. Read image data is transmitted to the principal operating section 16.

Then, the outer peripheral surface of each of the image carriers 54 is charged by the charger 56, and is exposed to a light beam L emitted from the exposure unit 62 according to the transmitted image data. An electrostatic latent image is thereby formed on the outer peripheral surface of the image carrier 54. Electrostatic latent images formed on the outer peripheral surfaces of the image carriers 54 are developed by the developing units 58 into toner images of yellow (Y), magenta (M), cyan (C), and black (K).

Next, the toner images formed on the outer peripheral surfaces of the image carriers 54 are transferred in order onto the intermediate transfer belt 66 by the first transfer rollers 68 at the first transfer positions. Then, the multiple toner images transferred on the intermediate transfer belt 66 are second-transferred onto a front surface of recording paper P transported through the transport path 30 by the second transfer roller 70 and the auxiliary roller 72.

The recording paper P with the toner images transferred on its front surface is transported toward the fixing device 80 by the transport belt 78. Then, the toner images on the front surface of the recording paper P are heated and pressurized by the fixing device 80, and the toner images are thereby fixed on the front surface of the recording paper P. After the tone images are fixed, the recording paper P is output to the paper output portion 28. In this way, a series of image forming steps are completed.

To form a toner image on a back surface of the recording paper P on which no image is formed (duplex printing), the recording paper P having the toner image fixed on its front surface is sent into the duplex transport path 40. The recording paper P is transported through the duplex transport path 40 to the transport rollers 36 again, and a toner image is transferred onto the back surface at the second transfer position. After the toner image is transferred on the back surface of the recording paper P, it is fixed on the recording paper P by the fixing device 80, and the recording paper P is output to the paper output portion 28.

As illustrated in FIG. 2, a panel member or the like is not provided between the image reading device body 100A and the image forming apparatus body 10A, and the projecting bottom wall 126 of the image reading device body 100A is disposed in the receiving portion 20 between the toner cartridge 88Y and the toner cartridge 88M. The vertical walls 92A and 94A overlap with the vertical walls 122C and 122D in the up-down direction, respectively.

Moreover, the support frames 92 and 94 to which the upper end portion of the first standing wall 90 is joined extend inward in the right-left direction on the upper side of the image forming apparatus body 10A, and the bent reinforcing portions 93 and 95 extending in the front-rear direction are provided integrally with the inner end portions of the support frames 92 and 94 in the right-left direction. That is, the rubber support members 132 and 134 for supporting the image reading device 100 are attached to the inner upper faces of the groove portions 96 and 98 whose rigidity (strength) is increased by the reinforcing portions 93 and 95.

The foregoing description of the image forming apparatus 10 according to the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, the support members 132 and 134 may be attached to the lower faces of the stepped portions 122A and 122B provided in the bottom wall 122 of the image reading device body 100A, instead of being attached to the inner upper faces of the groove portions 96 and 98 provided in the support frames 92 and 94 of the image forming apparatus body 10A.

The exemplary embodiment may be applied to a CIS document reading unit 106 in which an imaging system 128 moves together with a light irradiating unit 110. Further, vibration resistance and frequency characteristic are not changed only by changing the thickness of the rubber material, but may be changed by changing the shape, elastic modulus, and hardness of the rubber material.

What is claimed is:

1. An image forming apparatus comprising:
   an image forming apparatus body including an image forming section that forms an image;
   an image reading device disposed on an upper side of the image forming apparatus body to read an image;
   a first wall provided in the image forming apparatus body;
   a second wall provided in the image reading device having stepped portions recessed upward, to overlap with the first wall in an up-down direction; and
   at least one support member provided in the image forming apparatus body or the image reading device to overlap with the first wall and the second wall in the up-down direction, the at least one support member supporting the image reading device relative to the image forming apparatus body.

2. An image forming apparatus comprising:
   an image forming apparatus body including an image forming section that forms an image;
   an image reading device disposed on an upper side of the image forming apparatus body to read an image:
   a first wall provided in the image forming apparatus body;
   a second wall provided in the image reading device, to overlap with the first wall in an up-down direction; and
   at least one support member provided in the image forming apparatus body or the image reading device to overlap with the first wall and the second wall in the up-down direction, the at least one support member supporting the image reading device relative to the image forming apparatus body, wherein the first wall and the second wall overlap with each other with the at least one support member being disposed therebetween, and are each formed by bending sheet metal.

3. An image forming apparatus comprising:
   an image reading device including an opening and closing portion that turns on a hinge portion to open and close a platen glass and disposed on an upper side of an image forming apparatus body;
   a first standing wall disposed in an axial direction of the hinge portion on a side of the image forming apparatus body near the hinge portion;
   a second standing wall disposed in the axial direction of the hinge portion on a side of the image reading device near the hinge portion; and
   at least one support member provided in the image forming apparatus body or the image reading device so as to overlap with the first standing wall and the second standing wall in plan view, the at least one support member supporting the image reading device relative to the image forming apparatus body.

4. An image forming apparatus comprising:
   an image forming apparatus body including an image forming section that forms an image;
   an image reading device disposed on an upper side of the image forming apparatus body to read an image;
   a first wall provided in the image forming apparatus body;
   a second wall provided in the image reading device, to overlap with the first wall in an up-down direction; and
   at least one support member provided in the image forming apparatus body or the image reading device to overlap with the first wall and the second wall in the up-down direction, the at least one support member supporting the image reading device relative to the image forming apparatus body,
   wherein the image reading device includes a movable light irradiating unit and a fixed imaging system, and
   wherein the at least one support member includes a plurality of support members provided apart from each other in a moving direction of the light irradiating unit with the light irradiating unit and the imaging system being disposed therebetween, and the support member on one side near the imaging system provided in the image reading device has a vibration resistance higher than that of the support member on the other side.

5. The image forming apparatus according to claim 3,
   wherein the image reading device includes a movable light irradiating unit and a fixed imaging system, and
   wherein the at least one support member includes a plurality of support members provided apart from each other in a moving direction of the light irradiating unit with the light irradiating unit and the imaging system being disposed therebetween, and the support member on one side near the imaging system provided in the image reading device has a vibration resistance higher than that of the support member on the other side.

6. The image forming apparatus according to claim 2,
   wherein the image reading device includes a movable light irradiating unit, and
   wherein the at least one support member includes a plurality of support members that are formed of an elastic material, are provided apart from each other in a moving direction of the light irradiating unit, and have different frequency characteristics.

7. The image forming apparatus according to claim 3,
   wherein the image reading device includes a movable light irradiating unit, and
   wherein the at least one support member includes a plurality of support members that are formed of an elastic material, are provided apart from each other in a moving direction of the light irradiating unit, and have different frequency characteristics.

8. The image forming apparatus according to claim 2,
   wherein the image reading device includes a movable light irradiating unit, wherein the light irradiating unit radiates light in a light irradiating direction perpendicular to a moving direction thereof, and wherein the at least one support member includes a plurality of support members having the same thickness and arranged in a direction perpendicular to the moving direction of the light irradiating unit and the light irradiating direction.

9. The image forming apparatus according to claim 3, wherein the image reading device includes a movable light irradiating unit, wherein the light irradiating unit radiates light in a light irradiating direction perpendicular to a moving direction thereof, and wherein the at least one support member includes a plurality of support members having the same thickness and arranged in a direction perpendicular to the moving direction of the light irradiating unit and the light irradiating direction.

10. The image forming apparatus according to claim 2, wherein the at least one support member is provided in the image forming apparatus body, and an area of an upper face of the at least one support member is smaller than an area of a lower face.

11. The image forming apparatus according to claim 3, wherein the at least one support member is provided in the image forming apparatus body, and an area of an upper face of the at least one support member is smaller than an area of a lower face.

12. The image forming apparatus according to claim 1, wherein the at least one support member is disposed in a substantially U-shaped bent structure portion provided in the image forming apparatus body.

13. The image forming apparatus according to claim 3, wherein the at least one support member is disposed in a substantially U-shaped bent structure portion provided in the image forming apparatus body.

14. An image forming apparatus comprising:
an image forming apparatus body including an image forming section that forms an image;
an image reading device disposed on an upper side of the image forming apparatus body to read an image;
a first wall provided in the image forming apparatus body;
a second wall provided in the image reading device, to overlap with the first wall in an up-down direction; and
at least one support member provided in the image forming apparatus body or the image reading device to overlap with the first wall and the second wall in the up-down direction, the at least one support member supporting the image reading device relative to the image forming apparatus body, wherein the first wall and the second wall overlap with each other with the at least one support member being disposed therebetween, and each of the first wall and second wall comprise a plurality of surfaces arranged at angles.

15. The image forming apparatus according to claim 14, wherein the plurality of surfaces comprise sheet metal.

16. The image forming apparatus according to claim 14, wherein the first wall comprises two surfaces arranged at a first angle to form a first bend, and the second wall comprises two surfaces arranged at a second angle to form a second bend.

17. The image forming apparatus according to claim 14, wherein the first wall comprises a first bend, and
wherein the second wall comprises a second bend.

* * * * *